Aug. 8, 1967
C. A. RICHIE
3,335,207
METHOD AND APPARATUS FOR FORMING FOAMED
LOW DENSITY SHEET PLASTIC
Filed Oct. 11, 1963
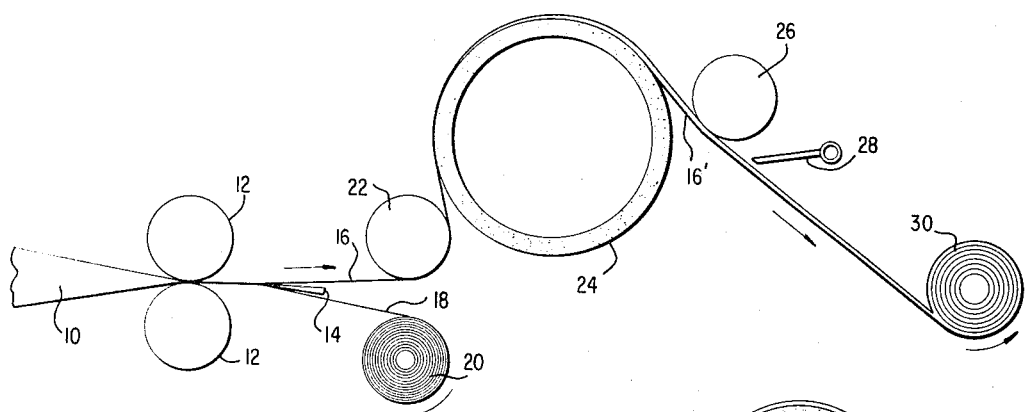
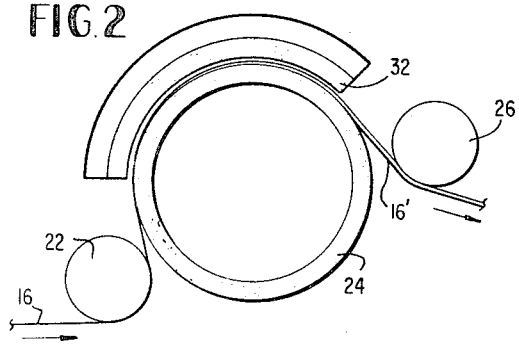
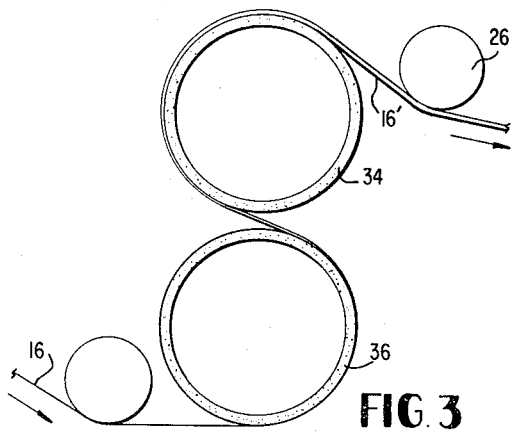
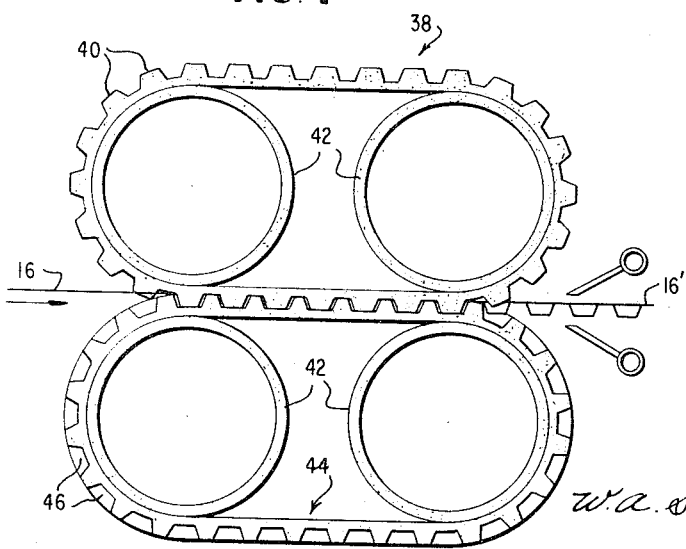
INVENTOR.
CARLTON A. RICHIE
BY
ATTORNEYS

United States Patent Office 3,335,207
Patented Aug. 8, 1967

3,335,207
METHOD AND APPARATUS FOR FORMING FOAMED LOW DENSITY SHEET PLASTIC
Carlton A. Richie, Toledo, Ohio, assignor to Owens-Illinois, Inc., a corporation of Ohio
Filed Oct. 11, 1963, Ser. No. 315,614
7 Claims. (Cl. 264—48)

The present invention relates to a method and apparatus for forming foamed sheet plastic of uniform density and caliper.

In the making of foamed plastic, particularly foamed polystyrene, it is well known to subject expandable polystyrene beads, which contain a foaming agent, to a first heating step in which the beads are preliminarily expanded and thereafter have the beads undergo a further expansion by a subsequent second heating step.

This same general technique has also been applied to the forming of a foamed polystyrene plastic sheet. Thus, foamable beads are fed to an extruder and as the polystyrene issues from the extruder die, a bubble of foamed polystyrene plastic is formed. This bubble is then passed between pinch rolls so as to form a two layer laminate of foamed polystyrene plastic which is subsequently slit into two strips. Each of these strips can then be further expanded by subjecting the strip to a heat treatment. In one method this is done by passing the partially expanded polystyrene strip into a tank of hot water where a further expansion of the plastic occurs. However, this method has several disadvantages. For example, the process is slow in that the sheet must be in contact with the hot water for a relatively long time, that is, 30 seconds and more. Furthermore, use of a tank for immersing the partially expanded polystyrene is cumbersome and necessitates a later drying of the polystyrene.

Another method of obtaining a further expansion of the partially expanded polystyrene plastic sheet includes passing the sheet into a chamber heated by steam or radiant heaters. However, with this method there is difficulty in obtaining a sheet of uniform thickness and density.

Accordingly, it is an object of this invention to provide a method of forming foamed sheet plastic of uniform low density.

A further object of this invention is to provide a continuous method for forming foamed plastic sheet material.

A further object of this invention is to provide an apparatus for carrying out the foregoing methods.

These and other objects of this invention will become apparent as the following description proceeds, and the features of novelty which characterize my invention will be set forth in the claims appended to and forming a part of this specification.

In accordance with the present invention, cellular or foamed plastic sheet, as produced by the blown tube method, is further expanded by passing the sheet over a moving porous surface which emits steam or other heated fluids directly against the sheet. This porous surface can take a number of forms, such as, a porous revolving drum. As a result, an even expansion of the plastic sheet will occur since the rotating drum will supply an even linear as well as transverse tension to the sheet whereby a smooth sheet of uniform caliper is formed.

For a further understanding of the invention, reference is made to the accompanying drawing in which:

FIG. 1 is a sectional view of a complete apparatus for carrying out the method of this invention;

FIG. 2 is a sectional view of a modified form of a moving porous surface usable in the apparatus of FIG. 1;

FIG. 3 is a sectional view of a further modified form of apparatus similar to FIG. 2; and FIG. 4 is a sectional view of a further modified form of apparatus similar to FIG. 2.

Referring to FIG. 1, a cellular or foamed polystyrene tube 10, as produced by the well known blown tube method, is shown passing through pinch rolls 12 to collapse or fold the tube 10. A cutter 14 is shown for slitting the tube 10 into two sheets, 16 and 18. Means for storing lower sheet 18 for later processing comprises a take-up roll 20. A tension roll 22 is employed for uniformly tensioning sheet 16 and the sheet is advanced to a rotating steam drum 24 which advances sheet 18 and which is power driven by means not shown. The outer surface of drum 24 is porous and is supplied with steam from a source not shown. The sheet 16 is advanced beyond the drum 24 to a second tension roll 26. Cooling air is thereafter supplied through a pipe 28. A take-up roll 30 is provided for advancing and storing the further expanded foamed sheet 16'.

In operation, a partially foamed polystyrene tube 10 is passed through pinch rolls 12 so as to collapse tube 10. Thereafter, tube 10 is slit into two sheets by cutter 14 with the lower sheet 18 so formed being wound up on roll 20 for later processing. The upper sheet 16 is kept under tension by means of roll 22 and caused to pass over perforated drum 24 where the sheet 16 is caused to come into moving contact with live steam which is supplied to the interior of drum 24. The application of steam causes the foamed sheet 16 to undergo a further expansion and the sheet in this form is indicated as 16'. Thereafter, the sheet 16' is advanced to tension roll 26, cooled by air pipe 28 so as to set sheet 16' in its expanded form, and finally stored on take-up roll 30.

By way of specific example, a polystyrene sheet 16 having a density of 6 lbs./cu. ft. and at .040 inch caliper as it left the pinch rolls 12, when subjected to 10 seconds of steam emitted from the porous surface of drum 24 of FIG. 1 produced a sheet 16' that had a density of 2.5 lbs./cu. ft. and a sheet caliper of .120 inch. In addition, it was noted that the sheet 16' was free of wrinkles and of uniform caliper.

In the modification shown in FIG. 2, a matching steam emitting shoe 32 of similar porosity and contour is used in conjunction with drum 24 so as to provide a layer of steam to both sides of the partially foamed sheet 16. With this construction, the smoothness and uniformity of caliper of sheet 16 can be further improved since shoe 32 and drum 24 are adjustably mounted so that the spacing thereof can be carefully regulated for purposes of controlling the thickness or caliper of sheet 16 as it undergoes a second expansion between drum 24 and shoe 32 to form sheet 16'.

FIG. 3 illustrates a further modification in which the drum 24 and shoe 32 of FIG. 2 are replaced by two stacked porous steam drums 34 and 36 about which sheet 16 is "S" wrapped and further expanded to produce the completely expanded sheet 16'. It is also contemplated with this modification to have only one of the steam drums, 34 and 36, with a porous surface for emitting steam directly against partially foamed sheet 16. This is particularly desirable where sheet width draw down is to be minimized.

In the FIG. 4 modification a revolving conveyer 38 having porous plugs 40 for emitting steam, mounted on rotating drums 42, driven by power means not shown, cooperates with a similar power driven second conveyer 44 having matching porous cavities 46 for emitting steam, mounted on drums 42, to form molded articles which can have a 1:2 depth to diameter draw ratio. Steam is supplied to the drums 42 from a source not shown. The drums 42 are in turn interconnected with the plugs 40 and cavities 46. Articles with a 1:1 depth to diameter ratio have also been obtained depending upon the type of foamable polystyrene beads employed in the extruder which forms the sheet 16 by the blowntube methods. In this modification it is to be understood that the moving conveyers 38 and 40 are to be substituted for the stacked porous steam drums 34 and 36 of FIG. 3.

With each of the above modifications a sheet 16 having a caliper of .040 inch and 6 lbs./cu. ft. density was converted to a flat or molded sheet 16' having a caliper of .120 inch and a density of 2.5 lbs./cu. ft. after the steam treatment or forming.

Other modifications will be apparent to those skilled in the art. For example, any partially foamed plastic sheet which is capable of further expansion can be used in the present process and apparatus. Moreover, any heat treatment can be employed in the method and apparatus disclosed therein. Thus, it will be evident that heated fluids other than steam can be employed provided the fluid does not chemically interact with the plastic. Accordingly, it will be understood that it is contemplated by the appended claims to cover all such modifications which fall within the true spirit and scope of the present invention as disclosed and claimed.

I claim:

1. A method of further expanding a partially expanded sheet of foamed, cellular thermoplastic which comprises imparting a continuous, uniform, linear and transverse tension in the sheet, advancing the sheet and contacting one side thereof while under said tension with at least one porous member, simultaneously contacting the sheet with a heated fluid emitted from said member so as to expand the sheet, and thereafter cooling and permanently setting the further expanded sheet.

2. The method of claim 1 wherein the opposite side of the sheet is contacted with at least one further porous member and heated fluid emitted therefrom before the cooling and setting of the sheet.

3. The method of claim 2 wherein at least one porous member is in moving contact with the sheet.

4. The method of claim 1 wherein the thermoplastic is polystyrene.

5. Apparatus for heat expanding a continuous, partially expanded cellular plastic sheet which comprises means for drawing the sheet in continuous, strip form from a supply thereof to a take-up roll, at least one rotating porous drum in direct contact with one side of the sheet for applying a hot fluid to the sheet during a portion of the sheet's travel from the supply to the take-up roll, means intermediate the supply and take-up roll for maintaining the moving sheet in predetermined tension, and cooling means intermediate the porous drum and take-up roll for cooling and permanently setting the expanded sheet.

6. The apparatus of claim 5 wherein there is further included a matching porous shoe in contact with that side of the sheet opposite to the side in contact with the rotating drum.

7. The apparatus of claim 5 wherein there is provided at least two porous drums, each drum being in contact with an opposite side of the sheet.

References Cited

UNITED STATES PATENTS

| | | | |
|---|---|---|---|
| 1,423,349 | 7/1922 | McClenathen | 18—6 |
| 2,230,189 | 1/1941 | Ferngren | 18—19 |
| 2,522,359 | 9/1950 | Haren | 18—6 |
| 2,595,964 | 5/1952 | Lovell | 18—4 XR |
| 2,629,899 | 3/1953 | Aller | 264—321 XR |
| 2,698,260 | 12/1954 | Meauze et al. | |
| 2,878,153 | 3/1959 | Hacklander | 264—321 XR |
| 2,942,301 | 6/1960 | Price et al. | 264—292 |
| 2,975,470 | 3/1961 | Snelson et al. | 18—6 XR |
| 3,011,217 | 12/1961 | Carlson | 264—53 |
| 3,042,972 | 7/1962 | Lafferty | 264—53 |
| 3,069,725 | 12/1962 | Root | 264—51 |
| 3,159,693 | 12/1964 | Plymale | 264—53 |
| 3,170,974 | 2/1965 | Jacobs | 264—321 XR |
| 3,200,437 | 8/1965 | Sasanko | 18—4 XR |
| 3,210,447 | 10/1965 | Cyr et al. | 18—6 XR |

FOREIGN PATENTS

| | | |
|---|---|---|
| 187,302 | 10/1956 | Austria. |
| 1,165,798 | 10/1958 | France. |
| 1,180,049 | 6/1959 | France. |
| 124,976 | 3/1949 | Sweden. |

OTHER REFERENCES

Stastny, Fritz: "Formen und Vorrichtungen zur Verarbeitung von Styropor," (BASF reprint from Der Plastverarbeiter, 9, 1954, pp. 260–271) pp. 5–7.

Translation: "Molds and Fixtures for Styropor Fabrication," pp. 3–5.

ALEXANDER H. BRODMERKEL, *Primary Examiner.*

P. E. ANDERSON, *Assistant Examiner.*